United States Patent
Kwong et al.

(10) Patent No.: US 11,118,804 B2
(45) Date of Patent: Sep. 14, 2021

(54) BUILDING AUTOMATION SYSTEM AND METHOD USING CEILING-MOUNTED INFRARED SENSORS

(71) Applicant: Delta Controls Inc., Surrey (CA)

(72) Inventors: Robert Christopher Kwong, Coquitlam (CA); John Vincent Nicholls, Surrey (CA); Dmitri John De Vaz, Surrey (CA); Kevin Scott Batdorf, New Westminster (CA); Derek John Vanditmars, Vancouver (CA); Junsang Yoo, Burnaby (CA); Lap Yan Jonathan Tsui, Surrey (CA); Andrew Michael Swanton, Surrey (CA)

(73) Assignee: DELTA CONTROLS INC., Surrey (CA)

(*) Notice: Subject to any disclaimer, the term of this patent is extended or adjusted under 35 U.S.C. 154(b) by 186 days.

(21) Appl. No.: 16/354,007

(22) Filed: Mar. 14, 2019

(65) Prior Publication Data

US 2019/0285300 A1     Sep. 19, 2019

Related U.S. Application Data

(60) Provisional application No. 62/644,000, filed on Mar. 16, 2018.

(51) Int. Cl.
*F24F 11/46* (2018.01)
*F24F 11/54* (2018.01)
(Continued)

(52) U.S. Cl.
CPC .............. *F24F 11/46* (2018.01); *F24F 11/00* (2013.01); *F24F 11/54* (2018.01); *F24F 11/58* (2018.01);
(Continued)

(58) Field of Classification Search
CPC .. F24F 11/46; F24F 11/80; F24F 11/65; F24F 11/54; F24F 11/58; F24F 11/00;
(Continued)

(56) References Cited

U.S. PATENT DOCUMENTS 5,986,357 A * 11/1999 Myron ............... G06K 9/00362
307/116
2012/0130547 A1* 5/2012 Fadell .................... G05B 15/02
700/276

(Continued)

*Primary Examiner* — Md Azad
(74) *Attorney, Agent, or Firm* — Edward C. Kwok; VLP Law Group, LLP (57) ABSTRACT

A ceiling-mounted sensing unit includes (i) one or more air temperature sensors; (ii) an infrared sensor having a field of view oriented towards a floor of the room; and (iii) a microcontroller receiving readings from both the air temperature sensors and the infrared sensor, the microcontroller providing an estimated temperature at a predetermined distance above the floor of the room based on a model of the room. The model may be based on a double-exponential smoothing function obtained by matching a Kalman filter model. Alternately, the model may be itself a Kalman filter model or a machine learning trained linear model obtained using a linear regression technique, such as L2 regularization. The Kalman filter model uses a state vector that includes both the estimated temperature and a rate of change in the estimated change in temperature. The machine-trained model may be verified using a k-fold cross-validation technique.

23 Claims, 7 Drawing Sheets (51) Int. Cl.
  F24F 11/58    (2018.01)
  F24F 11/65    (2018.01)
  F24F 11/80    (2018.01)
  G05B 13/02    (2006.01)
  G05B 13/04    (2006.01)
  G01J 5/08     (2006.01)
  G01J 5/04     (2006.01)
  G01J 5/02     (2006.01)
  G01J 5/00     (2006.01)
  F24F 11/00    (2018.01)
  F24F 140/60   (2018.01)
  F24F 110/10   (2018.01)
  F24F 120/12   (2018.01)
  F24F 120/20   (2018.01)
  F24F 120/14   (2018.01)
  F24F 140/50   (2018.01)
  G01J 5/06     (2006.01)

(52) U.S. Cl.
  CPC .............. *F24F 11/65* (2018.01); *F24F 11/80* (2018.01); *G01J 5/0003* (2013.01); *G01J 5/0022* (2013.01); *G01J 5/025* (2013.01); *G01J 5/026* (2013.01); *G01J 5/041* (2013.01); *G01J 5/089* (2013.01); *G05B 13/027* (2013.01); *G05B 13/048* (2013.01); *F24F 2110/10* (2018.01); *F24F 2120/12* (2018.01); *F24F 2120/14* (2018.01); *F24F 2120/20* (2018.01); *F24F 2140/50* (2018.01); *F24F 2140/60* (2018.01); *G01J 2005/068* (2013.01)

(58) Field of Classification Search
  CPC .............. F24F 2120/20; F24F 2120/12; F24F 2120/14; F24F 2140/60; F24F 2140/50; F24F 2110/10
  USPC .......................................... 700/276
  See application file for complete search history.

(56) References Cited

U.S. PATENT DOCUMENTS

| | | | |
|---|---|---|---|
| 2014/0148706 A1* | 5/2014 | Van Treeck | F24F 11/30 600/474 |
| 2015/0019024 A1* | 1/2015 | Sabripour | G06N 3/063 700/276 |
| 2015/0123562 A1* | 5/2015 | Adriaenssens | G01J 5/04 315/291 |
| 2018/0004173 A1* | 1/2018 | Patel | G05B 17/02 |
| 2019/0086528 A1* | 3/2019 | Steiner | F24F 7/007 |

* cited by examiner

BUILDING AUTOMATION SYSTEM AND METHOD USING CEILING-MOUNTED INFRARED SENSORS

CROSS REFERENCE TO RELATED APPLICATIONS

The present invention relates to and claims priority of U.S. provisional patent application ("Provisional Application"), Ser. No. 62/644,000, entitled "Building Automation System," filed on Mar. 16, 2018. The disclosure of the Provisional Application is hereby incorporated by reference in its entirety.

BACKGROUND OF THE INVENTION

1. Field of the Invention

The present invention relates to building automation. In particular, the present invention relates to methods for sensing occupancy and for sensing temperature at occupant height in a building automation system.

2. Discussion of the Related Art

People control the environment of their space or facility based on discomfort or a specific need at the time. In this manner, however, the correction occurs after the occupant is already uncomfortable or has been adversely impacted (e.g., adverse impact on productivity in an office or factory floor). Often, the actions taken by the occupant are seldom recorded or acknowledged for future reference, so that the same uncomfortable conditions perpetuate. Furthermore, existing building automation systems are not fully cognizant of actual space utilization (e.g., level of occupancy), so that the resources under their control are ineffectively and effectively deployed. Therefore, the existing environmental adjustment schemes cause occupant discomfort and disruption, while being inefficiency and even wasteful of energy and resources. It is preferable to be able to reduce adverse impact by anticipating in real time both occupant needs and space utilization.

SUMMARY OF THE INVENTION

The present invention makes environmental adjustments in real time to respond to anticipated occupant needs within the facility, so that increased comfort and productivity are achieved before the occupants' discomfort is realized. The methods of the present invention better track environment changes based on a model synthesized from a large amount of collected data and by using sensors that react to the source of environmental changes. The system also detects occupancy and maintains environmental control over a space effectively to conserve energy.

According to another aspect of the present invention, based on the readings of both air temperature sensors and at least one infrared (IR) temperature sensor, a method and a ceiling-mounted sensing unit estimate occupant-height temperature in a room. In one embodiment, the ceiling-mounted sensing unit is mounted close to the center of the room. By providing the IR temperature sensor a controlled field-of-view (FOV) pointed downward toward the floor (e.g., 60°-80°), a model that tracks the air temperature and the temperature detected by the IR sensor based on radiant energy estimates an occupant-height room temperature. The FOV may be adjusted using a dome shaped metal plate or lens, which restricts the FOV and limits background noise. The metal plate is a thermal conductor. The metal plate is maintained a temperature close to the temperature of the sensor body, thereby allowing narrowing of the FOV without significantly impacting measurement.

In one embodiment, the model is derived using either machine-learning techniques (e.g. such as a linear regression based on a generalized linear model), statistical techniques (e.g., Kalman filtering), or both. In one embodiment, "ground truth" measurements are made in multiple rooms using temperature sensors at occupant height. The readings of ceiling-mounted sensing units of the present invention are then recorded for each of the multiple rooms over several months. After a pre-processing step, the readings were divided into several subsets for training, cross-validation, and testing, respectively. Several machine-learning models (e.g., generalized linear model, decision trees, neural network) are trained using a k-fold cross-validation technique. The performance is also compared to those of several non-learning methods (e.g., average, Kalman filter, and the holt-winters method). The inference corresponding to the model with the best accuracy for the least computational load is deployed on a resource-constrained microcontroller in the sensing unit.

In a sensor unit of the present invention, the IR sensor allows detection of a change in thermal load (e.g., when one or more occupants arrive within a short time period in a previously vacant room) in software or firmware running on the microcontroller prior to the environment change (e.g., increasing temperature) becoming apparent to the occupants. The thermal load change can be detected much sooner than using only conventional temperature sensors, as the resulting change air in temperature may occur over time, often up to an additional half hour, depending on room parameters. A sooner detection of the thermal load change by the IR sensor allows an early response (e.g., activation of the HVAC system to adjust the room parameters) ahead of any discomfort felt by the occupants. According to one embodiment of the invention, a 1-point calibration may be applied to calibrate for sensing height, airflow, floor material and other room parameters.

According to one embodiment of the present invention, a ceiling-mounted sensing unit includes an adjustable mount for easy adjustment of angular positions during the installation, independent of the installation angle of the supporting electrical or junction box. The angular adjustable mount not only allows the sensors' readings to be optimized, but also allows the installer to fine-tune the overall look of the product relative to the building's or room's interior.

The present invention is better understood upon consideration of the detailed description below in conjunction with the drawings.

DETAILED DESCRIPTION OF THE PREFERRED EMBODIMENTS

Figure 1A:
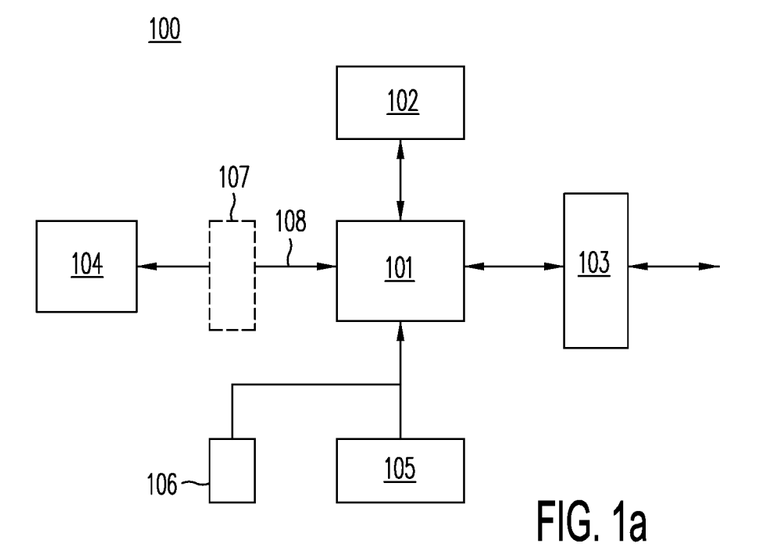
FIG. 1a shows a block diagram of circuit 100 suitable for implementing the sensor electronics in a sensing unit of the present invention.

According to one embodiment of the present invention, an apparatus ("sensing unit") that includes various sensors is provided to sense various environmental parameters in a room, such as temperature, humidity, and occupancy. FIG. 1a shows a block diagram of circuit 100 suitable for implementing the sensor electronics in a sensing unit of the present invention. As shown in FIG. 1a, circuit 100 includes microcontroller 101 that provides overall control for the sensing unit. Microcontroller 101 may be implemented, for example, by a suitable microprocessor, such as the STM32F327IG. In FIG. 1a, controller 101 includes various communication interfaces 102 (e.g., Bluetooth, USB and CAN, NIR) and memory interfaces 103 (e.g., non-volatile, SRAM). Communication interfaces 102 allow integration into a larger system (e.g., a building automation system) and with other devices. A CAN interface is well-known to those of ordinary skill in the art which is often used for that purpose.

In this description, circuit 100 provides examples of temperature and occupancy detections. In FIG. 1a, controller 101 communicates with temperature sensor circuit 104 that senses a temperature at occupant-height in the room. Microcontroller 101 also communicates with pyroelectric motion detector or passive infrared (PIR) motion sensor 105 and one or more microphones 106 which allow detection of room occupancy, as described below. In this embodiment, microcontroller 101 communicates with sensor circuit 104 over an industry standard interface (e.g., the I2C serial bus). PIR motion sensor 105 may be implemented, for example, by the IRS-B210ST01 device, together with a suitable band-pass filter. Microphones 106 may be implemented, for example, by a digital microphone circuit (e.g., the MP34DB02), with a pass-band between 20 Hz-20 KHz.

Because the circuit elements in circuit 100 may generate both heat and noise that interfere with the measurements in temperature sensor circuit 104, in some embodiments, sensor circuit 104 is thermally insulated from the rest of circuit 100 using, for example, a "thermal dam," indicated in FIG. 1a by thermal dam 107. Thermal dam 107 prevents, for example, heat conduction between the sensor circuit portion of the printed circuit board and the computational and control electronics (e.g., output signal generation circuits to actuators).

Figure 1B:
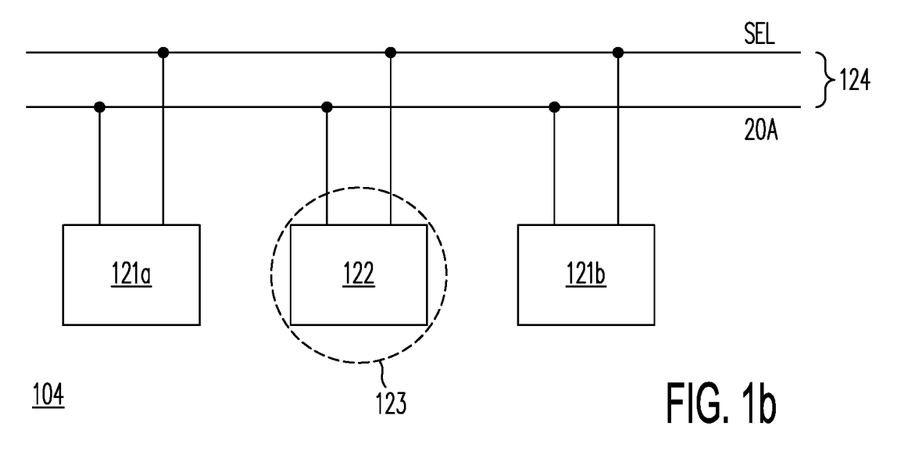
FIG. 1b shows one implementation of sensor circuit 104 of FIG. 1a, in accordance with one embodiment of the present invention.

FIG. 1b shows one implementation of sensor circuit 104 of FIG. 1a, in accordance with one embodiment of the present invention. As shown in FIG. 1b, sensor circuit 104 includes conventional highly linear, high-accuracy digital temperature sensors 121a and 121b (e.g., TMP112 temperature sensors) and low-power IR sensor 122 (e.g., TPiS 1S 1385 thermopile sensor) each communicating over I2C serial bus 124. IR sensor 122 has, preferably, a wide field of view. In one embodiment, reflective dome 123 (e.g., a hemispherical lens) may be provided to tailor the desired field of view. Alternately, the field of view may be restricted by a suitably shaped metal plate. In one example, sensor circuit 100 may be ceiling-mounted in a sensor-hub at 7-11 feet from the floor, with IR sensor 122's field of view being restricted by reflective dome 123 to 70 degrees to reduce noise variances. IR sensor 122's wide field of view encompasses a large area, not a single point. For example, at a 9-foot mounting height, IR sensor 122's field of view encompasses 125 ft$^2$. which allows its readings to be more reflective of the actual room temperature, rather than specific spots in the room. Provided that the ceiling mounting location avoids a ceiling diffuser (or other sources of strong air flow or heat) and the temperature model includes noise-rejection, the advantages of the present invention may be realized.

As IR sensor 122 measures the energy emitted by bodies in its field of view, not from the air in contact, it has a shorter response time than those of air temperature sensors 121a and 121b. The step increase and step decrease that result from a heat source (e.g., a human body) entering or leaving the room, respectively, may be registered by IR sensor 122 practically immediately, such that the resulting reading of the thermal load based on combining the readings of these sensors reflects the temperature change minutes before the change in air temperature may be detected. Consequently, a control system may take advantage of this detected thermal load change by initiating a control response (e.g., cooling or heating the room) earlier than a conventional air temperature-based thermostat. Such a control scheme results in smaller variations in room temperature, thereby improving occupant comfort.

In most applications, for energy efficiency reasons, temperature control is active only when a room is deemed occupied. When a room is deemed unoccupied, as indicated by binary signal "occupied" being set to a 'false' state, microphones 106 sample the noise level in the room every 30 seconds, for example, so as to collect an average inactive noise level in the room. This average inactive noise level is saved as a reference against a subsequent current reading to determine if the cirremt noise level has returned to an "inactive" reading.

PIR motion sensor 105 sets the binary signal "occupied" to a 'true' state, when it detects motion. Once binary signal "occupied" is set to a 'true' state, it remains in the 'true' state until PIR motion sensor 105, microphones 106 and IR sensor 122 all provide inactive readings for a predetermined period (e.g., five minutes). At that point, signal "occupied" is reset to a 'false' state. Microphones 106 provide an inactive reading when the detected noise level is lower than the average inactive noise level by a preset threshold. IR sensor 122 provides an inactive reading when it detects IR energy in the human body temperature range to be less than a preset threshold. These preset thresholds may be adjusted empirically to achieve a desired sensitivity level.

According to one embodiment of the present invention, temperature at occupant-height (e.g., 1.5 meters) is measured by filtering the readings of temperature sensors 121a and 121b and IR sensor through a double exponential smoothing filter which parameters are matched to the dynamics of a Kalman filter model. Alternatively, the Kalman filter model may also be used directly, although it may be necessary to verify the Kalman Filter's stability under the room condition (e.g., under the specific HVAC environment). The method of the double exponential smoothing filter is known to those skilled in the art.

Generally, in a double exponential smoothing filter, the equations for the smoothed temperature $S_t$, and a trend following value $b_t$ at time t are given by:

$$S_t = \alpha x_t + (1-\alpha)(S_{t-1} + b_{t-1}) \quad 0 \leq \alpha \leq 1$$

$$b_t = \gamma(S_t - S_{t-1}) + (1-\gamma)b_{t-1} \quad 0 \leq \gamma \leq 1$$

where $x_t$ is the temperature estimated from the current readings of temperature sensors 121a, 121b and IR sensor 122 (e.g., using a complementary filter over the IR energy-based reading of IR sensor 122 and the average reading of air temperature sensors 121a and 121b), and where $\alpha$, $\gamma$, $S_0$, and $b_0$ may be determined from matching the Kalman filter model.

In one embodiment, the Kalman filter model is obtained by acquiring data from many different room environments over a relative long time period (e.g., 2 months). In addition to readings from sensor circuit 104 (i.e., measurements made using temperature sensors 121a and 121b, and IR sensor 122), "ground truth measurements" were made using reference thermistors, existing wall thermostats, and precision reference sensors positioned at occupant-height in each room environment. The raw temperature data from all of the sensors were used to develop the occupant-height temperature models, including the Kalman filter model.

In the Kalman filter model, the three temperature readings from temperature sensors 121a and 121b, and IR sensor 122 are fed into a Kalman filter in real time, the weights given to each sensor's reading determines the contribution of the sensor towards the estimated occupant-height temperature. The Kalman filter accounts for not only the current temperature readings, but also previous temperature readings, while responding to temperature changes and rejecting noise. As a result, the temperature model based on the Kalman filter responds more quickly than a conventional thermostat, while providing substantial rejection to noise (e.g., sudden spikes in temperature due to random events, such as movement of people into and out of the field of view of IR sensor 122). The ground truth temperature sensors calibrate the estimated temperature of the Kalman filter model.

In one embodiment of the present invention, the Kalman filter model is developed using:

(i) a state vector x which includes as parameters both the temperature T and the rate of change $\dot{T}$:

$$x = \begin{bmatrix} T \\ \dot{T} \end{bmatrix}$$

(ii) a state-transaction or process model F, which incorporates a kinematic model in which temperature changes from time k to time k+1 according: $T_{k+1} = T_k + \Delta t \cdot \dot{T}_k$, while the rate of change of temperature is substantially constant (i.e., $\dot{T}_k = \dot{T}_{k-1}$)

$$F = \begin{bmatrix} 1 & \Delta t \\ 0 & 1 \end{bmatrix}$$

(iii) initial error covariance matrix $P_0$[1] and constant noise covariance matrix Q which is developed from a white noise model:

[1] Converged values from running the Kalman filter model over a trial run in one room environment, adopted in subsequent environments room environments to reduce the number of iterations necessary to achieve convergence.

$$P_0 = \begin{bmatrix} 0.804482226 & 0.163046503 \\ 0.163046503 & 1000.11676 \end{bmatrix}$$

$$Q = \begin{bmatrix} 0.00025 & 0.0005 \\ 0.0005 & 0.001 \end{bmatrix}$$

(iv) observation model H, which includes (from top row to bottom row) (a) temperature and rate of change in temperature in the sensing unit; (b) temperature and rate of change in temperature measured in the ambient: (c) temperature and rate of change in temperature readings in temperature sensor 121a; (d) temperature and rate of change in temperature readings in IR sensor 122; and (e) temperature and rate of change in temperature readings in temperature sensor 121b:

$$H = \begin{bmatrix} 1 & 0 \\ 1 & 0 \\ 1 & 0 \\ 1 & 0 \\ 1 & 0 \end{bmatrix}$$

and (v) observation noise covariance matrix R, which is also developed from a white noise mode:

$$R = \begin{bmatrix} 5 & 0.08975657 & 1 & 1 & 1 \\ 0.08975657 & 1 & 1 & 1 & 1 \\ 0.08975657 & 1 & 1 & 1 & 1 \\ 0.08975657 & 1 & 1 & 1 & 1 \\ 0.08975657 & 1 & 1 & 1 & 1 \end{bmatrix}$$

The initial temperature estimate was set at the average temperature of all the sensors, except for IR sensor 122.

According to one embodiment of the present invention, rather than the Kalman filter model, other models may also be used. For example, in one embodiment, machine learning techniques were applied to create a temperature model based on linear regression, which is verified using a k-fold cross-validation. In one embodiment, cross-validation of the linear regression model was achieved by k-fold cross-validation across the room environments.

In one embodiment, a generalized linear model (GLM) with L2 normalization (i.e., ridge regression) is used. This machine learning method is known to those of ordinary skill in the art. In that GLM model, the predicted temperature $\hat{y}$ is given by:

$$\hat{y}(w;x) = w_0 + w_1 x_1 + \ldots + w_p x_p$$

where the vector $w = (w_1, \ldots, w_p)$ represents the weights given to each sensor reading $x_i$ of sensor reading vector X, $1 \leq i \leq p$. The goal of machine learning is to train the linear model to obtain a stable vector w that reliably predict the room temperature at occupant-height. The stable vector w minimizes the residual sum of squares, while penalizing large weights (using the hyper-parameter $\lambda$):

$$\min_w \|Xw - y\|_2^2 + \lambda \|w\|_2^2$$

According to one embodiment of the present invention, more than a million samples were collected along with the reference ("ground truth") temperature measurements in various room environments. The data were preprocessed to remove outliers and reduce noise. To prevent bias, the data were taken over a wider range of temperatures (e.g., 15° C.-30° C.). The readings from the various sensors were scaled and normalized to prevent any specific sensor from biasing the model to a feature simply because it is larger than others.

In one embodiment, based on the (a) temperature readings in the sensing unit; (b) temperature readings in the ambient: (c) temperature readings in temperature sensor 121a; (d) temperature readings in IR sensor 122; and (e) temperature readings in temperature sensor 121b, the following weights for vector $w(w_0, w_1, w_2, w_3, w_4, w_5)$ are found to be (1.80032, 0.17582, 0.17528, 0.17464, 0.20776, 0.15030).

The ceiling-mounted sensing units of the present invention may be installed in a wide variety of installation environments. In particular, the angular position of such a sensing unit may be easily adjusted, to allow an installers or room designer to mount such a sensing unit in a way that is most appealing to them. This positioning flexibility may be important for sensing units that are to be mounted in a hotel or other room types. The angular adjustable mount provides flexibility to easily adjust the angular position of ceiling mounted sensing units without regard to the orientation to the underlying electrical or junction box.

Figure 2A:
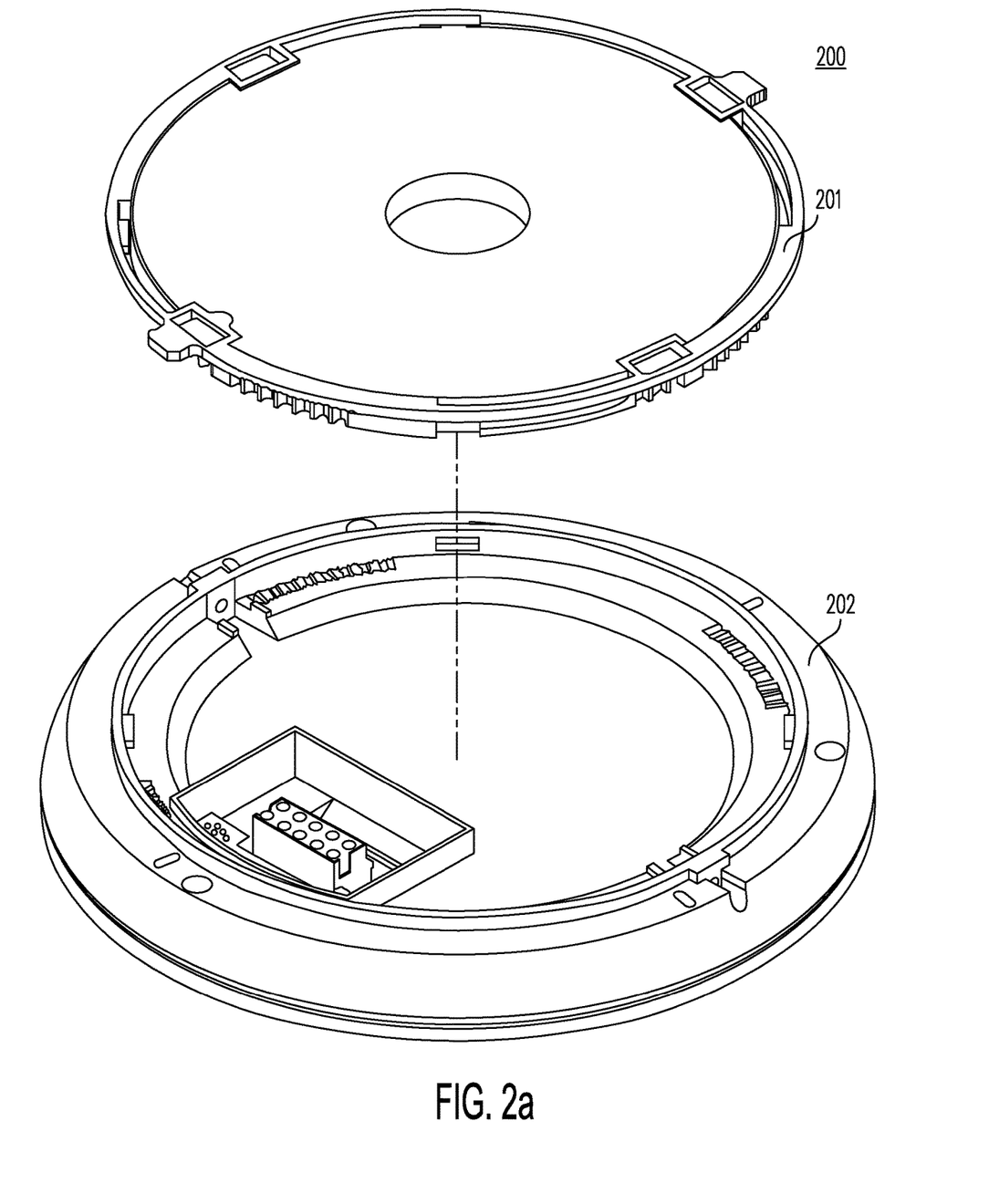
FIG. 2a shows sensing unit 202 being inserted into angular adjustable mount 201 at the desired orientation; adjustable mount 201 may then be rotated to lock sensing unit 202 into position.
Figure 2B:
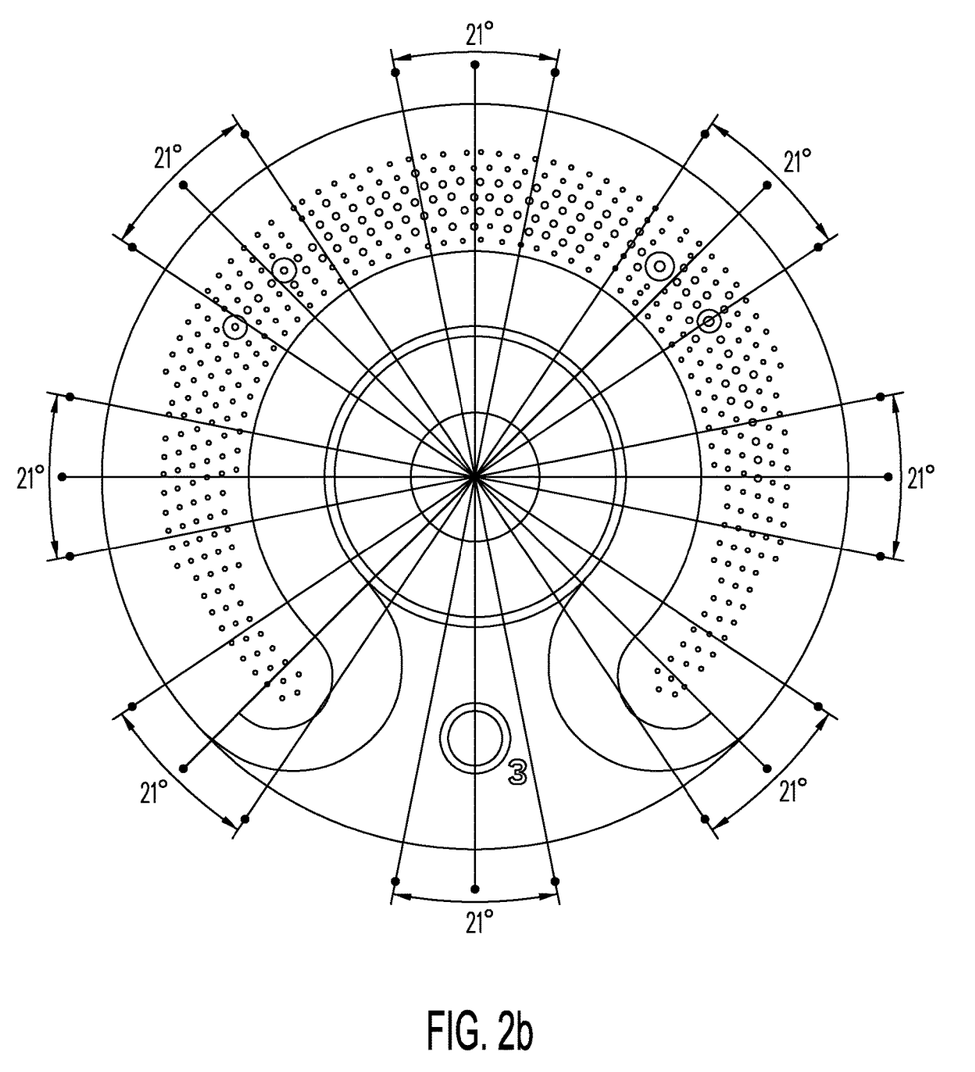
FIG. 2b shows the angles covered by angular adjustable mount 201, which can be mounted either perpendicular to, parallel, or at 45 degrees to the room's wall orientation.

FIG. 2a shows sensing unit 202 being inserted into angular adjustable mount 201 at the desired orientation; adjustable mount 201 may then be rotated to lock sensing unit 202 into position. FIG. 2b shows the angles covered by angular adjustable mount 201, which can be mounted either perpendicular to, parallel, or at 45 degrees to the room's wall orientation. Each orientation provides the installer with four insertion points, so that, for two orientations for insertions, a total eight insertion points is provided.

Figure 2C:
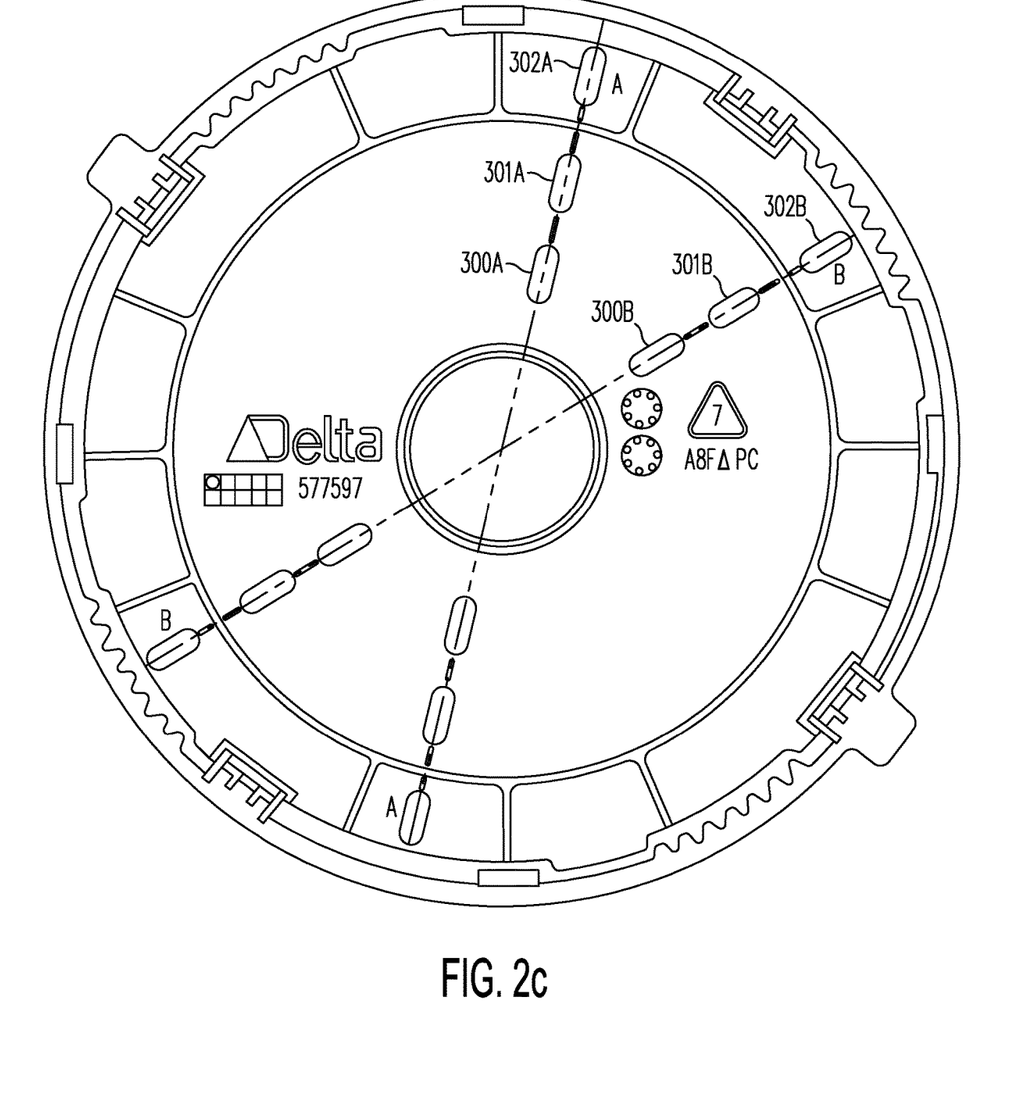
FIG. 2c shows bolt patterns for accommodating different junction boxes.

FIG. 2c shows bolt patterns for accommodating different junction boxes. For example, bolt positions 300A and 300B are slots provided for a 60 mm diameter junction box, bolt positions 301A and 301B are slots provided for a 3.5" octagon junction box with 75 mm and 60 mm bolt pitches, and bolt positions 302A and 302B are slots provided for a 4" square junction box. In the absence of a junction box in the ceiling, line "A" can be used to orient sensing unit 202 at 45 degrees to the room's wall orientation, while Line "B" can be used to orient sensing unit 202 to be perpendicular or to be parallel to the room's wall orientation.

Figure 2D:
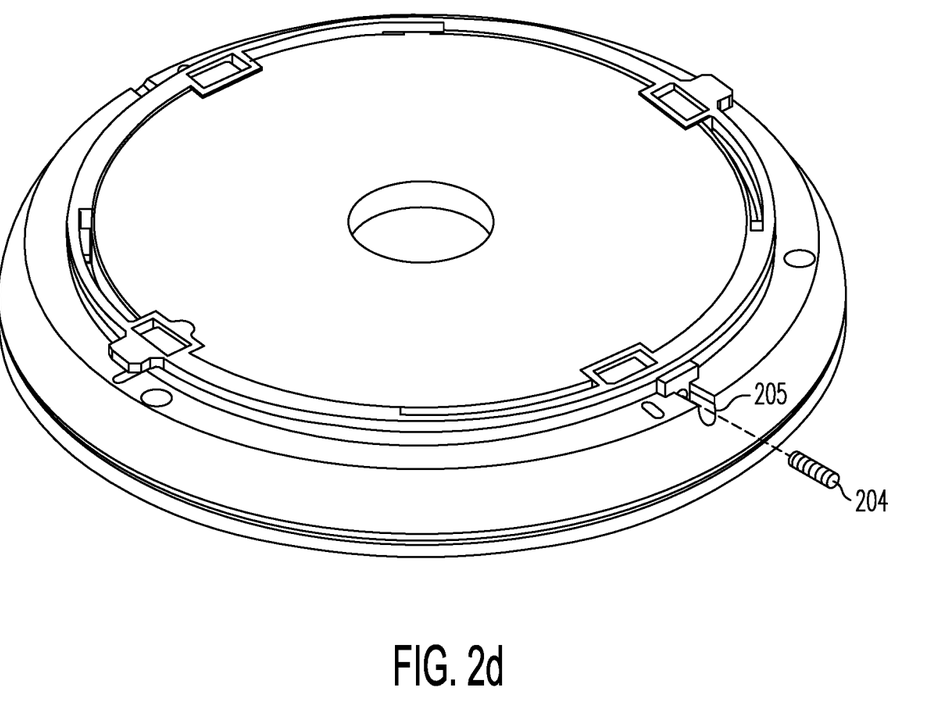
FIG. 2d illustrates locking feature 205 in angular adjustable mount 201, by which sensing unit 202 may be locked, using set screw 204.

FIG. 2d illustrates locking feature 205 in angular adjustable mount 201, by which sensing unit 202 may be locked, using set screw 204. As sensing unit 202 may be mounted in an unattended room, set screw 204 prevents sensing unit 202 from being easily removed by an unauthorized person. There are two locking features on opposite sides of adjustable mount 201 (only one is seen in FIG. 2d) for inserting set screw 204. Only one of the two locking features need to have a set screw inserted to lock sensing unit 202 in place. Providing two locking features on opposite sides of adjustable mount 201 facilitate an installer on a ladder, who is most likely having access to only 270 degrees, not the complete 360 degrees, while on the ladder. Having two locking features ensures that at least one of them is within reach, without requiring a repositioning of the ladder for a successful installation.

The sensing units or hubs of the present invention may be installed in a space or room controlled by a room or space controller in a building automation system, which may include various tiers of elements within the building system that control the environments, determine their occupancies and preferences. For example, each room or space in the building system may be provided a room or space controller, which is networked with other room or space controllers, with each room or space controller integrating sensors, output signals for driving actuators, and logic circuits or firmware for analyzing its space and for accepting user input and requests. Examples of sensors may include temperature, humidity, carbon dioxide, carbon monoxide, light intensity, light color, motion detection, infrared camera, video camera, ultrasound, and multi-directional microphones. Some of these sensors may use wireless communication to send its readings to the microcontroller. Some sensors are embedded directly in the room controller, while others may be provided on a local network or communicate point-to-point with the room controller. The room controller may share events, data and control decisions with each other and with zone and building controllers. A zone or building controller may, for example, aggregate data from all room controllers and may run advanced analytics for the zone or building. The zone controller is responsible for the building's energy policy and comparing utilization of rooms against each other, as well as processing intensive machine learning tasks. The zone controller's results may be used to update each room controller to improve local control efficiency.

According to one embodiment of the present invention, an address-assignment scheme is provided that improves the standard workflow of installing modules (e.g., sensing unit 202) in a building automation system. To be integrated into a building automation system, each module is assigned an address to uniquely identify the module in the building automation system. Such address may be assigned by, for example, physically setting a switch (e.g., a dip or rotary switch), or through a pre-configuration step (e.g., via a firmware download). Such procedures are error-prone, such that a method that allows skipping such a step results in a more robust solution, ensuring consistent addressing, avoiding address conflicts, and reduces the time required to install and to commission a module.

The address assignment scheme of the present invention automatically assigns an address to a module on a serial communication bus based on installation order, without prior configuration, physical settings or human intervention. Unlike modules on a conventional serial bus, which require that their individual addresses be configured before they can communicate on the serial bus, the address-assignment scheme of the present invention allows automatic detection of all modules communicating on the serial bus and the provisioning of physical addresses in order of their physical installation. Such an address assignment scheme allows easy module identification, even when modules have no externally identifiable attributes.

Figure 3A:
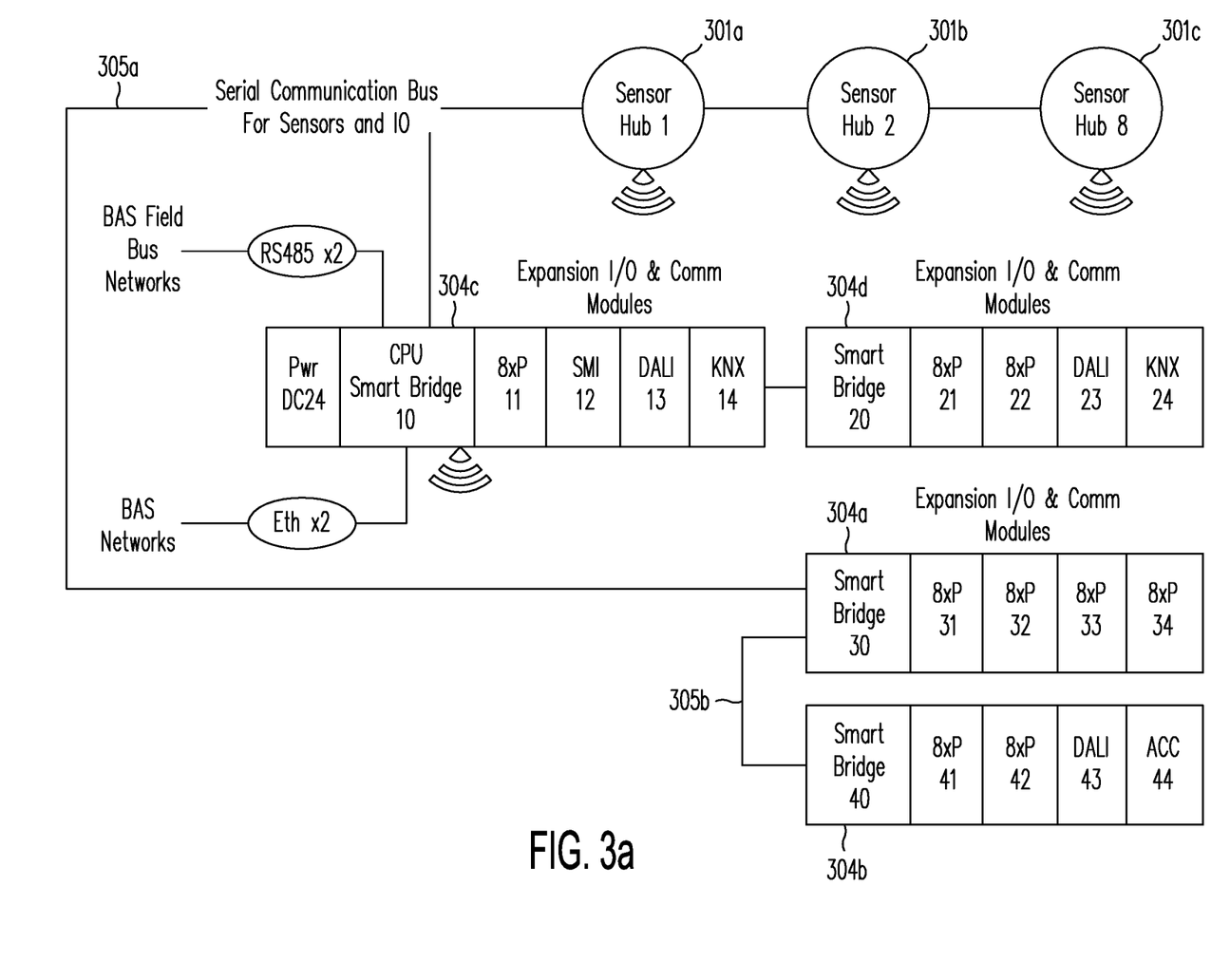
FIGS. 3a and 3b illustrate the address assignment scheme of the present invention.
Figure 3B:
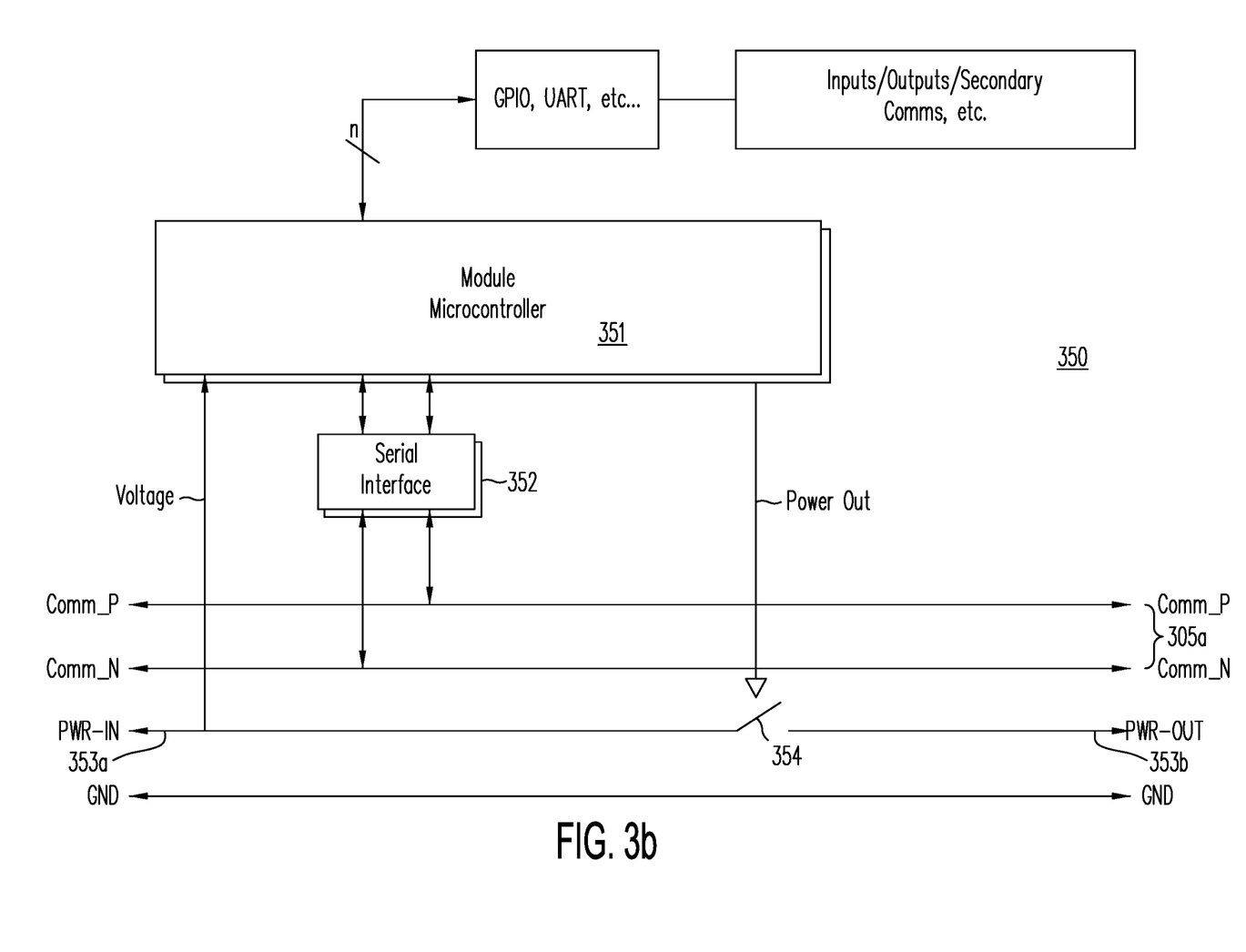

FIGS. 3a and 3b illustrates the address assignment scheme of the present invention. As shown in FIG. 3a, the sensors, actuators and other control elements may be integrated in a room environment (and beyond) using smart communication bridges (e.g., communication bridges 304a, 304b, 304c and 304d). Each communication bridge may connect to control elements (e.g., sensors) and another communication bridge using it various communication modules, such as a serial bus (e.g., serial bus 305a). FIG. 3b illustrates implementing the address assignment scheme of the present invention at the module level. In this example, module 350 may be, for example, one of the sensing units of the present invention. Module 350 includes microcontroller 351, serial communication interface 352, power input terminal 353a and power output terminal 353b. Power input terminal 353a and power output terminal 353b are parts of integrated power switch 354 in module 351, which allows module 350 to control the power supplied to the next module on the same serial bus (e.g., serial bus 305a). When power is first detected at module 350, integrated power switch 354 defaults to an open state (i.e., not connecting power output terminal 353b to power input terminal 353a), such that the module at power output terminal 353b is not powered. At this point, module 350 assigns itself a default address, which is detected by the communication bridge to which module 350 is connected. Upon detecting the default address, the communication bridge assigns a next available address to module 350. Upon receiving the newly assigned address, module 350 activates integrated power switch 354 to connect power input terminal 353a to power output terminal 353b, so as to supply power to the module at power output terminal 353b. This action enables the module at power output terminal 353b to repeat the address assignment process. The first module to receive an assigned address in a power group receives power from its connected communication bridge.

According to one embodiment of the present invention, each communication bridge is assigned a group of serial bus modules ("power group") and a configured address range from which the communication bridge may assign addresses to modules within its power group. Each communication bridge controls access by module in its assigned power group to a system-wide serial bus. The communication bridge disconnects its power group from the main serial bus until all modules in its power group are provisioned with addresses in its configured address range.

In some embodiments, a module in a power group may keep a previously provisioned address on subsequent power-ups. The protocol between a communication bridge and modules in its power group allows for determining modules via a unique identification and associating the unique identification with an assigned address. In this manner, a communication bridge may track assigned addresses. In a subsequent power-up, the communication bridge may revoke an assigned address if the module's presents an assigned address that does not match the address on record associated with the module's unique identification. The address assignment method of the present invention ensures a logical ordering of physical addresses, allowing a human to simply map module addresses to the physical order of their installation, which facilitates programming of the system.

The address assignment method of the present invention also avoids contention on the system-wide serial bus between CAN bus groups.

The detailed description above is provided to illustrate specific embodiments of the present invention and is not intended to be limiting. Numerous variations and modifications within the scope of the present invention are possible. The present invention is set forth in the accompanying claims.

We claim:

1. A sensing unit configured for mounting at a predetermined height above a floor in an enclosed space, comprising:
   one or more air temperature sensors;
   an infrared sensor having a field of view oriented towards the floor of the enclosed space; and
   a microcontroller receiving readings from both the air temperature sensors and the infrared sensor, wherein the microcontroller (i) determines a change in thermal load within the infrared sensor's field of view and an estimated temperature change at a predetermined distance above the floor, the predetermined distance being less than the predetermined height, based on a calibrated model of the enclosed space and the change in thermal load; and (ii) initiates an environmental control function in accordance with the estimated temperature change.

2. The sensing unit of claim 1, wherein the model is based on a double-exponential smoothing function.

3. The sensing unit of claim 2, wherein the double-exponential smoothing function is obtained by matching a Kalman filter model.

4. The sensing unit of claim 1, wherein the model comprises a Kalman filter model.

5. The sensing unit of claim 4, wherein the Kalman filter model comprises a state vector that includes both the estimated temperature change and a rate of change in the estimated temperature change.

6. The sensing unit of claim 1, wherein the model comprises a linear model obtained using machine learning technique.

7. The sensing unit of claim 6, wherein the machine learning technique comprises ridge regression technique.

8. The sensing unit of claim 6, wherein the linear model is verified using a k-fold cross-validation technique.

9. The sensing unit of claim 1, wherein the model is obtained using a neural network.

10. The sensing unit of claim 1, further comprising a reflective lens that restricts the field of view.

11. The sensing unit of claim 1, wherein the sensing unit further comprises a pyroelectric motion detector.

12. The sensing unit of claim 11, wherein the microcontroller initiates the environmental control function based on the estimated temperature change only after the pyroelectric motion detector detects motion, whereupon the microcontroller sets a space occupancy indicator to an occupied state.

13. The sensing unit of claim 12, further comprising a microphone wherein the space occupancy indicator remains in the occupied state until after a predetermined period of the later of the pyroelectric motion detector ceases to detect motion and the microphone senses a noise level in the space to be less than a predetermined value.

14. The sensing unit of claim 11, further comprising a microphone, wherein the pyroelectric motion detector and the microphone together detect space occupancy.

15. The sensing unit of claim 1, further comprising a microphone for detecting a level of a background noise.

16. The sensing unit of claim 1, further comprising a switch that selectively connects a power input terminal of the sensing unit to a power output terminal.

17. The sensing unit of claim 16, further comprising a bus interface to a system bus wherein, when power is detected on the power input terminal, the microcontroller assigns a default address to the sensing unit to request from a system controller an address assignment over the system bus.

18. The sensing unit of claim 17 wherein, when the system controller provides the sensing unit an address over the system bus, the microcontroller causes the switch to connect the power input terminal to the power output terminal.

19. The sensing unit of claim 18, wherein the system controller, upon receiving the address assignment request, assigns to the sensing unit an address from a configured range of addresses based on a predetermined order.

20. The sensing unit of claim 1, further comprising a thermal dam that thermally insulates the air temperature sensors and the infrared sensor from the microcontroller.

21. The sensing unit of claim 1, further comprising a serial bus, and wherein the air temperature sensors and the infrared sensor communicate with the microcontroller over the serial bus.

22. The sensing unit of claim 1, wherein the model of the space is extracted from numerous temperature measurements taken from numerous space environments and over different temperature ranges.

23. The sensing unit of claim 22 wherein, based on the estimated temperature and the model of the space, the microcontroller activates actuators to reduce energy use and to increase occupant comfort.

\* \* \* \* \*

UNITED STATES PATENT AND TRADEMARK OFFICE
CERTIFICATE OF CORRECTION

PATENT NO. : 11,118,804 B2
APPLICATION NO. : 16/354007
DATED : September 14, 2021
INVENTOR(S) : Robert Christopher Kwong et al.

It is certified that error appears in the above-identified patent and that said Letters Patent is hereby corrected as shown below:

On the Title Page

Item [72], delete:
"Robert Christopher Kwong,Coquitlam (CA); John Vincent Nicholls, Surrey (CA); Dmitri John De Vaz, Surrey (CA); Kevin Scott Batdorf, New Westminster (CA); Derek John Vanditmars, Vancouver (CA); Junsang Yoo, Burnaby (CA); Lap Yan Jonathan Tsui, Surrey (CA); Andrew Michael Swanton, Surrey (CA)"

And insert:
--Robert Christopher Kwong, Coquitlam (CA); John Vincent Nicholls, Surrey (CA); Dmitri Jude De Vaz, Surrey (CA); Kevin Scott Batdorf, New Westminster (CA); Derek John Vanditmars, Vancouver (CA); Junsang Yoo, Burnaby (CA); Lap Yan Jonathan Tsui, Surrey (CA); Andrew Michael Swanton, Surrey (CA)--

Signed and Sealed this
Second Day of August, 2022

Katherine Kelly Vidal
*Director of the United States Patent and Trademark Office*